United States Patent [19]

Fleischmann

[11] 4,430,554
[45] Feb. 7, 1984

[54] ELECTRICAL SAFETY DEVICE FOR HEATERS WITH A HIGH CURRENT CONSUMPTION

[75] Inventor: Karl-Heinz Fleischmann, Saal, Fed. Rep. of Germany

[73] Assignee: Forbach GmbH & Co. KG, Bad Neustadt, Fed. Rep. of Germany

[21] Appl. No.: 333,689

[22] Filed: Dec. 23, 1981

[30] Foreign Application Priority Data

Dec. 23, 1980 [DE] Fed. Rep. of Germany ....... 3048643

[51] Int. Cl.³ .............................................. H05B 1/02
[52] U.S. Cl. .................................... 219/483; 219/501; 219/322; 219/320; 361/103
[58] Field of Search ............... 219/483, 485, 486, 320, 219/321, 322, 328, 514, 519, 490, 491, 489, 501; 361/103

[56] References Cited

U.S. PATENT DOCUMENTS

| | | | |
|---|---|---|---|
| 3,261,992 | 7/1966 | Coe | 219/485 |
| 3,892,946 | 7/1975 | Rimmi | 219/483 |
| 3,979,576 | 9/1976 | Janson | 219/383 |

FOREIGN PATENT DOCUMENTS

| | | | |
|---|---|---|---|
| 0165661 | 4/1950 | Austria | 219/485 |
| 0875707 | 8/1961 | United Kingdom | 219/320 |

*Primary Examiner*—M. H. Paschall
*Attorney, Agent, or Firm*—Spencer & Frank

[57] ABSTRACT

A safety device for an electrical heater having at least one heating element which operates with high current consumption, and two power leads connected to respectively opposite ends of the heating element for connecting the heating element to a power supply. The device includes: a thermostatic switch for monitoring the temperature within the heater and having a temperature-actuated movable contact; a circuit breaker including at least one normally closed movable contact connected in series between the power leads, and a power responsive actuating coil for opening the normally closed contact in response to supply of electrical power to the coil, one side of the coil being connected to one side of the thermostatic switch movable contact; at least one first diode connected in series between one power lead and the other side of the thermostatic switch movable contact; and at least one second diode connected in series between the other side of the coil and the other power lead and poled, with respect to the voltage across the power lead, in the same direction as the first diode; whereby closing of the thermostatic switch movable contact causes power from the power supply to be supplied to the coil for opening the normally closed movable contact and disconnecting the heating element from the power supply.

5 Claims, 1 Drawing Figure

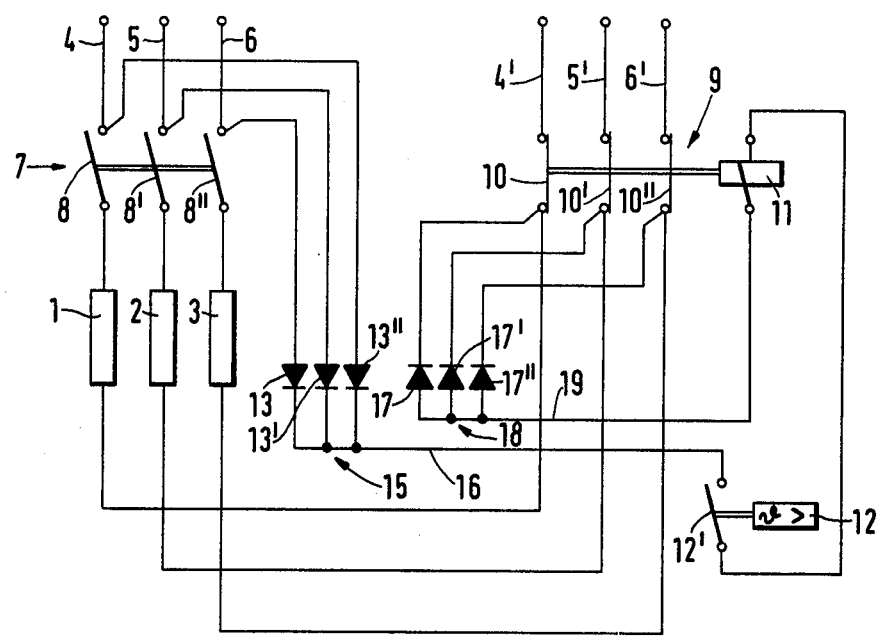

4,430,554

ELECTRICAL SAFETY DEVICE FOR HEATERS WITH A HIGH CURRENT CONSUMPTION

BACKGROUND OF THE INVENTION

The present invention relates to an electrical safety device for heaters employing heating elements with high current consumption, such as, for example, electric hot water heaters.

In connection with the type of electrical heater with relatively high current consumption as used in the United States, it is customary to connect such heaters to the current supply lines through the intermediary of several circuit breakers or fuses. The electromechanical expenditures for a safety device if one or more circuit breakers malfunction in a single device are considerable, and therefore results in high manufacturing or investment costs.

SUMMARY OF THE INVENTION

It is therefore an object of the present invention to provide an electrical safety device for a heater of the above-mentioned type which can be composed of a small amount of components and which assures reliable operation.

The above and other objects are achieved, according to the invention, by the provision of a safety device for an electrical heater having at least one heating element which operates with high current consumption, and two power leads connected to respectively opposite ends of the heating element for connecting the heating element to a power supply, which safety device includes:

thermostatic switching means for monitoring the temperature within the heater and having a temperature-actuated movable contact;

circuit breaker means including at least one normally closed movable contact connected in series between the power leads, and a power responsive actuating coil for opening the normally closed contact in response to supply of electrical power to the coil, one side of the coil being connected to one side of the thermostatic switching means movable contact;

at least one first diode connected in series between one power lead and the other side of the thermostatic switching means movable contact; and at least one second diode connected in series between the other side of the coil and the other power lead and poled, with respect to the voltage across the power lead, in the same direction as the first diode;

whereby closing of the thermostatic switching means movable contact causes power from the power supply to be supplied to the coil for opening the normally closed movable contact and disconnecting the heating element from the power supply.

Safety devices according to the invention are inexpensive to manufacture and are distinguished by particularly reliable and safe operation.

BRIEF DESCRIPTION OF THE DRAWING

One embodiment of the invention is illustrated in the sole FIGURE in the form of a circuit diagram and will be described in greater detail below.

DESCRIPTION OF THE PREFERRED EMBODIMENTS

As shown in the FIGURE, three heating elements 1, 2, 3 of an electrical continuous flow heater are each connected to an electrical power source through a respective one of leads 4, 5, 6. A pressure responsive switch arrangement 7 is composed of three switching elements 8, 8', 8" each disposed in a respective one of the three leads to be actuated, for example, in dependence on pressure by a water switch disposed in the incoming water conduit.

A three-pole safety switch 9 is provided with circuit breaker contacts 10, 10', 10" each interposed in a respective one of the second electrical leads 4', 5', 6' of the heating elements 1, 2, 3. Part of the safety switch 9 is an actuating coil 11 which is connected in series with the switching contact 12' of a temperature responsive switch, or thermostat, 12. The safety switch 9 is a device which keeps the contacts 10, 10', 10" closed via a mechanical lock and unlocks them by actuation of the actuating coil 11 to thus open the contacts. Switch 9 can be of the type which must be reclosed manually after opening. The temperature responsive switch 12 is controlled in dependence on, i.e. responds to, the temperature of the water in the continuous flow heater.

A respective first diode 13, 13' or 13" is connected in series with each of the three leads 4, 5, 6. The other terminals of the three first diodes 13, 13', 13" are electrically connected together at a point 15. A common diode output line 16 is connected in series between point 15 and one side of the switching contact 12' of the temperature responsive switch 12. A respective second diode 17, 17' or 17" is connected to each of the output lines 4', 5', 6', ahead of the contacts 10, 10', 10" of safety switch 9, and the second diodes are combined at a point 18 of a common diode input line 19. The diode input line 19 is connected in series with the above described actuating coil 11 of the safety switch 9.

The effect of the diodes 13, 13', 13" and 17, 17', 17" is to decouple the individual power lines 4, 5, and 6 or 4', 5' and 6', respectively, from one another while assuring the response of the actuating coil 11 of the three-pole safety switch 9 upon closing of contact 12' of the temperature switch 12. In this diode circuit arrangement, it is always reliably assured that the three-pole safety switch 9 will respond if all power supply paths 4, 4', etc. are intact or if only a single path is intact. A failure in any phase, or even two phases, will not affect operation of the coil 11 under control of the thermostatic switch 12.

The proposed diode circuit arrangement can be used to advantage for single phase as well as multiphase operation. Switches 7, 9 and 12 can all be of conventional design.

It will be understood that the above description of the present invention is susceptible to various modifications, changes and adaptations, and the same are intended to be comprehended within the meaning and range of equivalents of the appended claims.

What is claimed is:

1. A safety device for an electrical heater having at least one heating element which operates with high current consumption, comprising: two power leads for connection to a power supply;

thermostatic switching means for monitoring the temperature within the heater and having a temperature-actuated movable contact;

circuit breaker means including at least one normally closed movable contact arranged for connection, in series with a heating element, between the power leads, and a power responsive actuating coil for opening said normally closed contact in response to supply of electrical power to said coil, one side of said coil being connected to one side of said thermostatic switchng means movable contact;

at least one first diode connected in series between one power lead and the other side of said thermostatic switching means movable contact; and at least one second diode connected in series between the other side of said coil and the other power lead and poled, with respect to the voltage across the power leads, in the same direction as said first diode;

whereby closing of said thermostatic switching means movable contact will cause power from the power supply to be supplied to said coil for opening said normally closed movable contact and disconnecting the heating element from the power supply.

2. A safety device as defined in claim 1 for an electrical heater having a plurality of heating elements further comprising: a plurality of pairs of said power leads for connection to a power supply; a plurality of said first diodes each connected in series between one power lead of a respective pair and a common point connected to said other side of said thermostatic switching means movable contact; and a plurality of said second diodes each connected in series between a common point connected to said other side of said coil and the other power lead of a respective pair; and wherein said circuit breaker means include a plurality of said normally closed movable contacts, each arranged for connection, in series with a respective heating element, between the power leads of a respective pair.

3. A safety device as defined in claim 2 wherein said temperature actuated movable contact is normally open.

4. In combination with a plurality of heating elements for an electrical heater wherein each heating element is provided with a pair of power leads connected to respectively opposite ends of the heating element for connecting the respective heating elements to a power supply, a safety device comprising:

thermostatic switching means for monitoring the temperature within the heater and having a temperature-actuated normally open movable contact;

circuit breaker means including a plurality of normally closed movable contacts each connected in series with a respective heating element between the associated power leads, and a power responsive actuating coil for opening said normally closed contacts in response to supply of electrical power to said coil, one side of said coil being connected to one side of said temperature actuated movable contact;

a plurality of first diodes with each said first diode being connected between one power lead of a respective pair of power leads and the other side of said temperature actuated movable contact; and a plurality of second diodes with each said second diode being connected between the other side of said coil and the other power lead of a respective pair of power leads, said first and second diodes being poled such that each of said first diodes is connected in series with each of said second diodes via said temperature actuated movable contact and said coil;

whereby closing of said temperature actuated movable contact will permit power from a power supply connected to said power leads to be supplied to said coil to cause said coil to open said normally closed movable contacts and interrupt the power circuit to said heating elements.

5. Apparatus as defined in claim 4 wherein each of said second diodes is connected to said other power lead of a respective pair of power leads via the associated one of said normally closed movable contacts of said circuit breaker means.

* * * * *